(12) United States Patent
Innes et al.

(10) Patent No.: US 6,174,346 B1
(45) Date of Patent: Jan. 16, 2001

(54) DUPLEX PROCEDURE FOR THE PRODUCTION OF METALS AND METAL ALLOYS FROM OXIDIC METAL ORES

(75) Inventors: John Alexander Innes, Kew; Rodney James Dry, Mount Waverley, both of (AU)

(73) Assignee: Technological Resource Pty. Ltd., Melbourne (AU)

(*) Notice: Under 35 U.S.C. 154(b), the term of this patent shall be extended for 0 days.

(21) Appl. No.: 09/068,044

(22) PCT Filed: Nov. 4, 1996

(86) PCT No.: PCT/AU96/00696

§ 371 Date: Jul. 28, 1998

§ 102(e) Date: Jul. 28, 1998

(87) PCT Pub. No.: WO97/17473

PCT Pub. Date: May 15, 1997

(30) Foreign Application Priority Data

Nov. 3, 1995 (AU) .................................................. PN 6399

(51) Int. Cl.$^7$ .................................................. C21B 13/14
(52) U.S. Cl. ................................ 75/414; 75/446; 75/491
(58) Field of Search ............................... 75/446, 491, 414

(56) References Cited

U.S. PATENT DOCUMENTS

| | | |
|---|---|---|
| 3,936,296 | 2/1976 | Campbell . |
| 3,985,544 | 10/1976 | Collin . |
| 4,094,665 | 6/1978 | Collin . |
| 4,098,604 | 7/1978 | Collin . |
| 4,490,168 | 12/1984 | Formanek et al. . |
| 4,756,748 * | 7/1988 | Lu et al. .............................. 75/10.19 |
| 4,806,158 | 2/1989 | Hirsch et al. . |
| 4,880,458 | 11/1989 | Martinez-Vera et al. . |
| 4,946,498 | 8/1990 | Weber . |
| 5,069,716 | 12/1991 | Dam et al. . |
| 5,226,951 | 7/1993 | Kepplinger et al. . |
| 5,228,901 | 7/1993 | Taylor et al. . |
| 5,433,767 * | 7/1995 | Bresser et al. .......................... 75/446 |

FOREIGN PATENT DOCUMENTS

| | | |
|---|---|---|
| 649402 | 5/1994 | (AU) . |
| 0 184 405 | 6/1986 | (EP) . |
| 0 209 149 | 1/1987 | (EP) . |
| 1143527 | 2/1969 | (GB) . |
| 2 188 066 | 9/1987 | (GB) . |
| 52-105517 | 9/1977 | (JP) . |
| 6-271919 | 9/1994 | (JP) . |
| WO 89/08724 | 9/1989 | (WO) . |
| WO 90/07010 | 6/1990 | (WO) . |
| WO 93/06251 | 4/1993 | (WO) . |
| WO 96/31627 | 10/1996 | (WO) . |
| WO 97/17473 | 5/1997 | (WO) . |

* cited by examiner

Primary Examiner—Melvyn Andrews
(74) Attorney, Agent, or Firm—Merchant & Gould P.C.

(57) ABSTRACT

The production of highly metallized feed, an intermediate product produced solely by gaseous reductants in two stage reduction processes of that kind, encounters sticking problems, which interfere with continuous processing and productivity. This problem has been overcome by exploiting a high volatile carbonaceous material, such as coal, as the reducing agent for the (partially reduced) oxide ore starting material in the solid state prereduction stage of a duplex process, in which the final stage consists of smelting, to produce the final metal (alloy). Intermediate products of the first stage are char from the coal, which avoids the sticking problem, partially reduced ore and CO and $H_2$, which participate in the prereduction. The process has particular application to iron ores, such as haematite and magnetite and similar derivatives, namely, chromite and oxidic nickel ores. The process may be extended to a triplex, which includes drying, preheating and partial reduction in the first stage, followed by further partial reduction and finally the smelting step. The final stage of solid state reduction takes place at a temperature of at least 550° C., preferably 750–900° C. At least 50% of metallization is essential for satisfactory processing, preferably at least 80%.

18 Claims, 1 Drawing Sheet

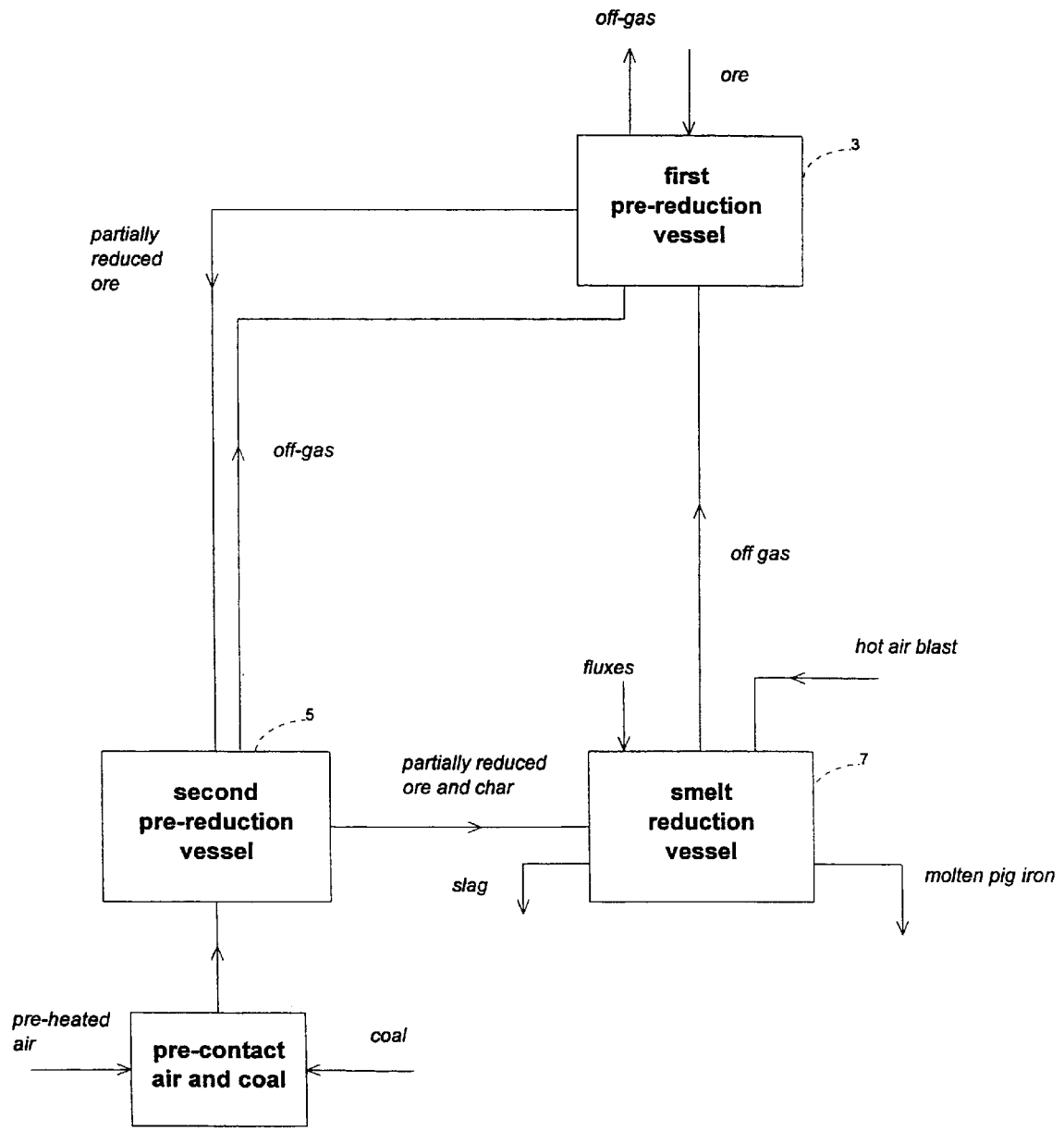

DUPLEX PROCEDURE FOR THE PRODUCTION OF METALS AND METAL ALLOYS FROM OXIDIC METAL ORES

FIELD

The present invention relates to a method and an apparatus for producing metals and metal alloys, in particular, although by no means exclusively iron and iron alloys, from metal oxides, such as ores and partly reduced ores.

BACKGROUND

There are a number of known methods of smelting iron ore to produce molten iron which are based on the use of a metallurgical vessel (hereinafter referred to as a "smelt reduction vessel") containing a molten bath of iron and slag.

In general terms, these known methods comprise injecting iron ore or partially reduced iron ore and a source of a carbonaceous material into a molten bath of iron and slag. In the molten bath the iron ore or partially reduced iron ore is reduced to metallic iron and melted. The carbonaceous material (in solid or gaseous form) is required as a source of reductant and thermal energy and to carburise the molten bath to produce pig iron (typically 1 to 4 wt. % carbon in metal).

In a number of known processes, reaction gases that are discharged from the smelt reduction vessel are used to preheat and to partially reduce iron ore in a pre-reduction vessel, such as a shaft furnace, prior to transferring the partially reduced iron ore into the smelt reduction vessel. These known processes are commonly described as being two-stage linked processes.

SUMMARY

An object of the present invention is to provide a method and an apparatus for producing molten iron which is an improvement over the known two-stage linked processes.

According to the present invention there is provided a method of producing metals and metal alloys from metal oxides which comprises the steps of:

(i) partially reducing metal oxides and/or partially reduced metal oxides and at least partially devolatilising a solid carbonaceous material, by injecting metal oxides and/or partially reduced metal oxides and the solid carbonaceous material into a pre-reduction vessel and maintaining a temperature of at least 550° C. in the pre-reduction vessel; and (ii) reducing further the partially reduced metal oxides to produce molten metal by injecting the partially reduced metal oxides and the at least partially devolatilised solid carbonaceous material from step (i) into a smelt reduction vessel containing a molten bath of metal and slag.

The at least partially devolatilised solid carbonaceous material produced in pre-reduction step (i) is a source of carbon for use in the subsequent smelt reduction step (ii). As is discussed above, the carbon is needed in the smelt reduction step (ii):

(a) to reduce the pre-reduced metal oxides to metal;

(b) to provide a source of thermal energy to melt the metal oxides; and (c) to carburise the bath to provide levels of dissolved carbon in metal that may be required to produce metal alloys in the molten bath.

The invention does not preclude injection into the smelt reduction vessel of carbonaceous materials in addition to the at least partially devolatilised solid carbonaceous material that is produced in the pre-reduction vessel.

For example, the invention extends to the injection of coal or other suitable solid carbonaceous materials or any suitable gaseous carbonaceous materials into the smelt reduction vessel in addition to the injection of the at least partially devolatilised solid carbonaceous material produced in the pre-reduction vessel.

It is preferred that the at least partially devolatilised solid carbonaceous material be char.

The term "char" is understood herein to mean the product of heating coal without burning the coal.

It is preferred that the pre-reduction step (i) partially reduces the metal oxides and/or partially reduced metal oxides to a pre-reduction degree of at least 50%.

The term "pre-reduction degree" is understood herein to mean the percentage of oxygen removal starting from $Fe_2O_3$.

It is preferred particularly that the pre-reduction step (i) partially reduces the metal oxides and/or partially reduced metal oxides to a pre-reduction degree of at least 60%.

It is preferred more particularly that the pre-reduction step (i) partially reduces the metal oxides and/or partially reduced metal oxides to a pre-reduction degree of at least 70%.

Typically, the pre-reduction step (i) partially reduces the metal oxides and/or partially reduced metal oxides to a pre-reduction degree of 80%.

The purpose of the solid carbonaceous material injected into the pre-reduction vessel in the pre-reduction step (i) is to provide:

(a) a source of the char or other at least partially devolatilised solid carbonaceous material for use subsequently in the smelt reduction step (ii); and (b) a source of reductant to pre-reduce the metal oxides in the pre-reduction vessel.

It is preferred that the solid carbonaceous material injected into the pre-reduction vessel be coal.

In that event, it is preferred that the temperature in the pre-reduction vessel be maintained at a temperature, typically less than 1000° C., at which the fixed carbon component of the coal does not act readily as a reductant. In such a situation, the volatiles, such as hydrocarbons, in the coal are the main source of reductant. Specifically, the hydrocarbons crack to form the reductants CO and $H_2O$ (and other products).

It is noted that the invention does not preclude the use of fixed carbon in the coal as a reductant in the pre-reduction vessel.

It is preferred that the pre-reduction step (i) comprises forming a fluidised bed of the metal oxides and/or partially reduced metal oxides and the solid carbonaceous material in the pre-reduction vessel.

It is preferred particularly that the fluidised bed be formed by injecting air into the pre-reduction vessel either directly or indirectly.

It is preferred that the temperature be maintained at the temperature of at least 550° C. in the pre-reduction vessel by:

(i) combusting coal and/or other carbonaceous materials (including gaseous carbonaceous materials) in the pre-reduction vessel; and/or (ii) providing heat energy by indirect heat exchange.

It is preferred that the temperature in the pre-reduction vessel be maintained at a temperature of at least 600° C.

It is preferred particularly that the temperature in the pre-reduction vessel be maintained at a temperature of at least 750° C.

It is preferred more particularly that the temperature in the pre-reduction vessel be maintained at a temperature of at least 800° C.

It is preferred that the temperature in the pre-reduction vessel be maintained at a temperature of less than 1000° C.

It is preferred particularly that the temperature in the pre-reduction vessel be maintained at a temperature of less than 1000° C.

The preferred temperature range for the pre-reduction vessel is 750 to 950° C.

The reduction and melting reactions in the smelt reduction step (ii) described above are endothermic and, therefore, it is preferred that the method includes a step of maintaining the temperature of the molten bath in the smelt reduction vessel above a minimum temperature.

It is preferred that the minimum temperature of the molten bath be in the range of 1350° C.–1500° C.

It is preferred that the step of maintaining the temperature of the molten bath in the smelt reduction vessel above the minimum temperature comprises post-combusting reaction gases, such as CO and $H_2$, released from the molten bath by injecting oxygen-containing gas into a gas space in the smelt reduction vessel above the molten bath and transferring energy generated by the post-combustion to the molten bath.

It is preferred that the oxygen-containing gas be air.

It is preferred particularly that the air be preheated to a temperature of at least 1000° C.

It is preferred that the pre-reduction step (i) comprises pre-reducing the metal oxides and/or partially reduced metal oxides in two or more pre-reduction stages.

It is preferred particularly that the pre-reduction step (i) comprises:

(i) a first pre-reduction stage of injecting metal oxides and reaction gases from the smelt reduction vessel and/or a second pre-reduction vessel into one pre-reduction vessel to dry, pre-heat, and partially reduce the metal oxides and, thereafter;

(ii) partially reducing further the metal oxides and producing the at least partially devolatilised solid carbonaceous material in the second pre-reduction stage by injecting the partially reduced metal oxides and solid carbonaceous material into another pre-reduction vessel and maintaining a temperature of at least 550° C. in the pre-reduction vessel.

It is preferred that the metal oxides be iron ore or ferrous containing wastes.

According to the present invention there is also provided an apparatus for producing metals and metal alloys from metal oxides which comprises:

(i) a pre-reduction vessel for at least partially reducing metal oxides and/or partially reduced metal oxides and for producing at least partially devolatilised solid carbonaceous material, the pre-reduction vessel comprising an inlet for injecting metal oxides and/or partially reduced metal oxides, an inlet for injecting solid carbonaceous material, and an outlet for discharging at least partially reduced metal oxides and at least partially devolatilised solid carbonaceous material; and (ii) a smelt reduction vessel for reducing further partially reduced metal oxides to produce metal and melting the metal, the smelt reduction vessel being adapted to contain a molten bath of metal and slag, the smelt reduction vessel comprising an inlet for the at least partially reduced metal oxides and the at least partially devolatilised solid carbonaceous material from the pre-reduction vessel and a means for injecting an oxygen-containing gas into the smelt reduction vessel to post combust reaction gases released from the molten bath.

It is preferred that the smelt reduction vessel comprises an outlet for reaction gases.

It is preferred that the smelt reduction vessel comprises a means for tapping slag from the smelt reduction vessel.

It is preferred that the smelt reduction vessel comprises a means for tapping metal from the smelt reduction vessel.

According to the present invention there is also provided an apparatus for producing metals and metal alloys from metal oxides which comprises:

(i) a first pre-reduction vessel for partially reducing metal oxides;

(ii) a second pre-reduction vessel for at least partially reducing partially reduced metal oxides from the first pre-reduction vessel and for producing at least partially devolatilised solid carbonaceous material, the pre-reduction vessel comprising an inlet for injecting partially reduced metal oxides, an inlet for injecting solid carbonaceous material, and an outlet for discharging at least partially reduced metal oxides and at least partially devolatilised solid carbonaceous material; and (iii) a smelt reduction vessel for reducing further the partially reduced metal oxides to produce metal and melting the metal, the smelt reduction vessel being adapted to contain a molten bath of metal and slag, the smelt reduction vessel comprising an inlet for the at least partially reduced metal oxides and the at least partially devolatilised solid carbonaceous material from the pre-reduction vessel and a means for injecting an oxygen-containing gas into the smelt reduction vessel to post combust reaction gases released from the molten bath.

It is preferred that the first pre-reduction vessel comprises an inlet for reaction gases from the smelt reduction vessel.

It is preferred that the smelt reduction vessel comprises an outlet for reaction gases.

It is preferred that the smelt reduction vessel comprises a means for tapping slag from the smelt reduction vessel.

It is preferred that the smelt reduction vessel comprises a means for tapping metal from the smelt reduction vessel.

BRIEF DESCRIPTION OF THE DRAWING

The single FIGURE is a flowsheet, in largely schematic form, of one preferred embodiment of the method and the apparatus of the present invention.

DETAILED DESCRIPTION

The description of the preferred embodiment shown in the FIGURES is in the context of producing iron from iron ore. However, it is noted that the preferred embodiment is equally applicable to producing metals and metal alloys from other metal oxides.

With reference to the FIGURE, in accordance with the preferred embodiment shown in that FIGURE:

(i) iron ore is partially reduced in two successive stages in first and second pre-reduction vessels 3, 5 and, thereafter;

(ii) the partially reduced iron ore is reduced further to produce iron and the iron is melted in a smelt reduction vessel 7.

The iron ore may be in any suitable form, such as lump or fines.

The pre-reduction vessels 3, 5 may be of any suitable type, such as shaft furnaces or fluidised beds. As will be discussed in more detail hereinafter, it is preferred that the pre-reduction vessel 5 be a fluidised bed.

The source of reductant for the first pre-reduction vessel 3 comprises reaction gases from the smelt reduction vessel 7.

The operating parameters of the first pre-reduction vessel 3 are selected to dry, pre-heat, and partially reduce iron ore to an initial, relatively low pre-reduction degree, typically of the order of 11% (ie magnetite).

The pre-reduction vessels 3, 5 are linked together by a standpipe (not shown) or any other suitable means to enable the transfer of partially reduced-iron ore from the first pre-reduction vessel 3 into the second pre-reduction vessel 5.

The source of reductant for the second pre-reduction vessel 5 comprises coal. The source of reductant may also comprise any other suitable carbon containing species.

The operating parameters of the second pre-reduction vessel 5 are selected so that:

(a) the volatiles, typically hydrocarbons, of the coal are cracked to produce carbon monoxide and hydrogen and the carbon monoxide and hydrogen complete reduction of the partially reduced iron oxides from the first pre-reduction vessel 3 to a required pre-reduction degree; and (b) the greater proportion of fixed carbon in the coal produces char.

The reactions to crack hydrocarbons, to reduce the partially reduced iron oxides, and to produce char are endothermic. Therefore, it is necessary to maintain the temperature of the second pre-reduction vessel 5 above a minimum temperature of 550° C. to provide sufficient thermal energy for the reactions. One option for maintaining the temperature is by direct-in-bed combustion of coal with air. Another option for maintaining the temperature is by indirect heat exchange, either via tubes or hot solids circulation or the like.

As noted above, it is preferred that the second pre-reduction vessel 5 operates as a fluidised bed. Typically, the fluidised bed is maintained by injecting preheated air into the pre-reduction vessel 5, either directly or indirectly. The fluidised bed may also be maintained by injecting oxygen and air/oxygen mixtures into the pre-reduction vessel 5.

The smelt reduction vessel 7 may be any suitable form of vessel.

The preferred smelt reduction vessel 7 is constructed to hold a molten bath of iron and slag and comprises:

(i) tuyeres (not shown) for injecting the at least partially reduced iron ore and char from the second pre-reduction vessel 5 into the molten bath;

(ii) tuyeres (not shown) for injecting a blast of hot air, typically at a temperature greater than 1000° C., into the space above the surface of the molten bath to post-combust reaction gases such as carbon monoxide and hydrogen released from the molten bath.

(iii) means for periodically tapping molten iron and slag; and (iv) an outlet for reaction gases.

The configuration of the smelt reduction vessel 7, including the positioning of the tuyeres, and the operating parameters of the method are selected to form a transition zone in the space above the molten bath surface in which there are ascending and therefore descending droplets or splashes of molten metal and slag which mix with reaction gases from the molten bath, top blown hot air, and the reaction gases from post combustion.

The purpose of the transition zone is to facilitate the efficient transfer to the molten bath of heat that is released by post combustion reaction gases from the molten bath.

The transition zone may be formed by any suitable means.

For example, the transition zone may be formed by injecting a suitable gas, such as an inert gas through the bottom of the smelt reduction vessel 7 to cause eruption of droplets or splashes of molten metal and slag from the molten bath into the space above the molten bath surface.

Alternatively, the transition zone may be formed by controlled injection of the at least partially reduced iron ore and char from the second pre-reduction vessel 5 into the molten bath through the side tuyeres in the smelt reduction vessel 7.

In accordance with the preferred embodiment, iron ore is injected into the first pre-reduction vessel 3 and is partially reduced, preferably to magnetite, and preheated by reaction gases discharged from the smelt reduction vessel 7. The partially reduced iron ore is discharged from the first pre-reduction vessel 3 and is injected with coal into the second pre-reduction vessel 5. Preferably, preheated air is also injected into the second pre-reduction vessel 5 (after being pre-contacted with fresh coal) and forms a bubbling fluidised bed of the partially reduced iron ore and char. As is discussed above, the operating parameters of the second pre-reduction vessel 5 are selected so that the bulk of the carbon component of the coal forms char and the volatilise of the coal are cracked to the reductants carbon monoxide and hydrogen which reduce the partially reduced iron ore to a required pre-reduction degree. Finally, the pre-reduced iron ore and char are discharged from the second pre-reduction vessel 5 and, together with fluxes, are injected into a molten bath of iron and slag in the smelt reduction vessel 7. Preheated air is also injected into the gas space of the smelt reduction vessel 7 and post combusts reaction gases, such as carbon monoxide and hydrogen, released from the molten bath. The heat generated by the post combustion is transferred to the molten bath to maintain the molten bath above a minimum temperature for enabling reduction of the partially reduced iron ore to metallic iron and melting the metallic iron.

The above described preferred embodiments of the present invention have a number of important advantages over conventional smelt reduction processes such as linked two-stage processes.

1. A significant increase in productivity in the smelt reduction vessel, leading to a reduction in refractory consumption and heat loss (per tonne of metal).

2. A widening of the span of coals which will perform well in a molten bath-based smelt reduction vessel. Since coal is pyrolysed and volatiles are used in the second pre-reduction vessel 5, only the char component is injected into the smelt reduction vessel. Unlike the known iron bath-based methods, high volatile coals can readily be accepted without penalties in coal consumption and productivity.

3. Decreased capital investment per annual tonne of capacity, along with decreased operating costs through reduced coal consumption.

4. The production of char in the pre-reduction stage of the method avoids sticking problems commonly encountered when producing highly metallised feed.

Many modifications may be made to the preferred embodiments of the method and the apparatus described above without departing from the spirit and scope of the invention.

What is claimed is:

1. A method of producing metals and metal alloys from metal oxides which comprises the steps of:

(i) injecting metal oxides into a first pre-reduction vessel, and drying, pre-heating, and partially reducing metal oxides in the first pre-reduction vessel by injecting reaction gases discharged from a smelt reduction vessel containing a bath of molten metal and slag and/or reaction gases discharged from a second pre-reduction vessel into the first pre-reduction vessel; and (ii) injecting the dried, pre-heated, partially reduced metal oxides from the first pre-reduction vessel into a second pre-reduction vessel, injecting solid carbonaceous material into the second pre-reduction vessel, maintaining a temperature of at least 550° C. in the second pre-reduction vessel, and reducing further the metal oxides and producing at least partially devolatilised solid carbonaceous material; and (iii) injecting the partially reduced metal oxides and the at least partially devolatilised solid carbonaceous material from the second pre-reduction vessel into the smelt reduction vessel, and reducing further the partially reduced metal oxides and producing molten metal.

2. The method defined in claim 1 further comprises injecting solid carbonaceous material or gaseous carbonaceous material into the smelt reduction vessel in smelt reduction step (iii) in addition to injecting the at least partially devolatilised solid carbonaceous material produced in the second pre-reduction vessel.

3. The method defined in claim 1 wherein the at least partially devolatilised solid carbonaceous material is char.

4. The method defined in claim 1 comprises partially reducing metal oxides in pre-reduction step (ii) to a pre-reduction degree of at least 50%.

5. The method defined in claim 4 comprises partially reducing metal oxides in pre-reduction step (ii) to a pre-reduction degree of at least 60%.

6. The method defined in claim 5 comprises partially reducing metal oxides in pre-reduction step (ii) to a pre-reduction degree of at least 70%.

7. The method defined in claim 1 wherein the solid carbonaceous material injected into the second pre-reduction vessel in pre-reduction step (ii) is coal.

8. The method defined in claim 7 comprises maintaining the temperature in the second pre-reduction vessel at less than 1000° C., at which the bulk of the fixed carbon component of the coal does not act readily as a reductant.

9. The method defined in claim 1 wherein pre-reduction step (ii) comprises forming a fluidised bed, either bubbling or circulating, of metal oxides and solid carbonaceous material in the second pre-reduction vessel.

10. The method defined in claim 9 comprises forming the fluidised bed by injecting air into the second pre-reduction vessel, either directly or indirectly.

11. The method defined in claim 1 comprises maintaining the temperature of at least 550° C. in the second pre-reduction vessel by:

(i) combusting coal and/or other carbonaceous materials in the second pre-reduction vessel; and/or (ii) providing heat energy by some form of indirect heat exchange, such as in-bed tubes or solids circulation.

12. The method defined in claim 1 comprises maintaining a temperature of at least 600° C. in the second pre-reduction vessel.

13. The method defined in claim 12 comprises maintaining a temperature of at least 750° C. in the second pre-reduction vessel.

14. The method defined in claim 1 comprises maintaining the temperature of the molten bath in the smelt reduction vessel above a minimum temperature.

15. The method defined in claim 14 comprises maintaining the temperature of the molten bath in the range of 1350° C.–1500° C.

16. The method defined in claim 14 comprises maintaining the temperature of the molten bath in the smelt reduction vessel above the minimum temperature by post-combusting reaction gases released from the molten bath by injecting oxygen-containing gas into a gas space in the smelt reduction vessel above the molten bath and transferring energy generated by the post-combustion to the molten bath.

17. The method defined in claim 16 wherein the oxygen-containing gas is air.

18. The method defined in claim 1 wherein the metal oxides are iron ore or ferrous containing wastes.

* * * * *